United States Patent [19]

Broderick et al.

[11] Patent Number: 5,545,416
[45] Date of Patent: Aug. 13, 1996

[54] GUM BASE MADE WITH REDUCED ANTIOXIDANT AND METHOD OF PREPARATION

[75] Inventors: Kevin B. Broderick, Berwyn; Joo H. Song, Northbrook; Donald J. Townsend, Chicago; David W. Record, River Forest; Henry T. Tyrpin, Midlothian, all of Ill.

[73] Assignee: Wm. Wrigley Jr. Company, Chicago, Ill.

[21] Appl. No.: 361,776

[22] Filed: Dec. 22, 1994

Related U.S. Application Data

[63] Continuation-in-part of Ser. No. 305,363, Sep. 13, 1994, abandoned.

[51] Int. Cl.$^6$ ........................................................ A23G 3/30
[52] U.S. Cl. ................................ 426/3; 426/6; 426/541
[58] Field of Search ...................................... 426/3–6, 541

[56] References Cited

U.S. PATENT DOCUMENTS

| | | | |
|---|---|---|---|
| H1241 | 10/1993 | Synosky et al. | 426/3 |
| 1,852,005 | 4/1932 | Garbutt . | |
| 1,855,017 | 4/1932 | Geller | 426/6 |
| 1,887,930 | 11/1932 | Hatherell | 426/6 |
| 1,953,295 | 4/1934 | Garbutt | 99/11 |
| 2,123,531 | 7/1938 | Hatherell | 99/135 |
| 2,125,562 | 8/1938 | Hatherell | 99/135 |
| 2,197,240 | 4/1940 | Hatherell | 99/135 |
| 2,256,190 | 9/1941 | Bowman | 107/54 |
| 2,284,804 | 6/1942 | De Angelis | 99/135 |
| 2,288,100 | 6/1942 | Manson | 99/135 |
| 2,383,145 | 8/1945 | Moose | 99/135 |
| 2,468,393 | 4/1949 | Corkery, et al. | 99/135 |
| 3,618,902 | 11/1969 | Brennan, Jr. et al. | 259/6 |
| 3,795,744 | 3/1974 | Ogawa et al. | 426/3 |
| 3,826,847 | 7/1974 | Ogawa et al. | 426/3 |
| 3,984,574 | 10/1976 | Comollo | 426/4 |
| 3,995,064 | 11/1976 | Ehrgott et al. | 426/3 |
| 4,064,274 | 12/1977 | Mackay et al. | 426/3 |
| 4,068,004 | 1/1978 | Carlin et al. | 426/3 |
| 4,187,320 | 2/1980 | Koch et al. | 426/3 |
| 4,202,906 | 5/1980 | Ogawa et al. | 426/3 |
| 4,208,431 | 6/1980 | Friello et al. | 426/3 |
| 4,217,368 | 8/1980 | Witzel et al. | 426/5 |
| 4,224,345 | 9/1980 | Tezuka et al. | 426/3 |
| 4,252,830 | 2/1981 | Kehoe et al. | 426/5 |
| 4,254,148 | 3/1981 | Ogawa et al. | 426/3 |
| 4,305,962 | 12/1981 | del Angel | 426/3 |
| 4,352,822 | 10/1982 | Cherukuri et al. | 426/4 |
| 4,357,354 | 11/1982 | Kehoe et al. | 426/3 |
| 4,379,169 | 4/1983 | Reggio et al. | 426/3 |
| 4,386,106 | 5/1983 | Merritt et al. | 426/5 |
| 4,387,108 | 6/1983 | Koch et al. | 426/4 |
| 4,452,820 | 6/1984 | D'Amelia et al. | 426/3 |
| 4,459,311 | 7/1984 | DeTora et al. | 426/3 |
| 4,490,395 | 12/1984 | Cherukuri et al. | 426/3 |
| 4,514,423 | 4/1985 | Tezuka et al. | 426/3 |
| 4,515,769 | 5/1985 | Marritt et al. | 424/49 |
| 4,555,407 | 11/1985 | Kramer et al. | 426/5 |
| 4,590,075 | 5/1986 | Wei et al. | 426/5 |
| 4,711,784 | 12/1987 | Yang | 426/5 |
| 4,721,620 | 1/1988 | Cherukuri et al. | 426/6 |
| 4,738,854 | 4/1988 | Friello et al. | 426/3 |
| 4,740,376 | 4/1988 | Yang | 426/5 |
| 4,794,003 | 12/1988 | Cherukuri et al. | 426/6 |
| 4,816,265 | 3/1989 | Cherukuri et al. | 426/5 |
| 4,850,842 | 7/1989 | Van Alstine | 425/205 |
| 4,872,884 | 10/1989 | Cherukuri et al. | 426/3 |
| 4,876,095 | 10/1989 | Yang | 426/3 |
| 4,882,172 | 11/1989 | Van Alstine | 425/113 |
| 4,933,189 | 6/1990 | Cherukuri et al. | 426/3 |
| 4,940,594 | 7/1990 | Van Alstine | 426/231 |
| 4,968,511 | 11/1990 | D'Amelia et al. | 426/6 |
| 4,992,280 | 2/1991 | Yung Chu et al. | 426/5 |
| 5,023,093 | 6/1991 | Cherukuri et al. | 426/3 |
| 5,045,325 | 9/1991 | Lesko et al. | 426/5 |
| 5,059,103 | 10/1991 | Bruckmann et al. | 425/67 |
| 5,075,291 | 12/1991 | DuRoss | 514/60 |
| 5,110,607 | 5/1992 | Yang | 426/3 |
| 5,135,760 | 8/1992 | Degady et al. | 426/5 |
| 5,158,725 | 10/1992 | Handa et al. | 264/40.7 |
| 5,158,789 | 10/1992 | DuRoss | 426/3 |
| 5,324,530 | 6/1994 | Kehoe et al. | 426/516 |
| 5,362,500 | 11/1994 | Mazurek et al. | 426/5 |
| 5,397,580 | 3/1995 | Song et al. | 426/5 |
| 5,413,799 | 5/1995 | Song et al. | 426/3 |
| 5,415,880 | 5/1995 | Song et al. | 426/3 |
| 5,419,919 | 5/1995 | Song et al. | 426/5 |

FOREIGN PATENT DOCUMENTS

| | | | |
|---|---|---|---|
| 0273809 | 12/1987 | European Pat. Off. | A23G 3/30 |
| 0524902 | 7/1992 | European Pat. Off. | A23G 3/30 |
| 2635441 | 8/1988 | France | A23G 3/30 |
| 1538785 | 1/1979 | United Kingdom | C08J 3/20 |
| 2049705 | 12/1980 | United Kingdom | C08J 3/20 |
| WO95/08272 | 3/1995 | WIPO | A23G 3/30 |
| WO95/10948 | 4/1995 | WIPO | A23G 3/30 |
| WO95/10947 | 4/1995 | WIPO | A23G 3/30 |
| WO95/10194 | 4/1995 | WIPO | A23G 3/30 |

OTHER PUBLICATIONS

Brochure—"Buss Technology For The Continous Compounding Of Chewing Gum And Bubble Gum", Buss AG (Apr. 24, 1995).

Brochure—"Process Technology Guide No. 42", Buss AG (Aug. 22, 1983)—Swiss document with English Translation.

(List continued on next page.)

*Primary Examiner*—Esther M. Kepplinger
*Assistant Examiner*—Milton I. Cano
*Attorney, Agent, or Firm*—Brinks Hofer Gilson & Lione

[57] ABSTRACT

A stabilized gum base and chewing gum are prepared using techniques that significantly reduce the amount of antioxidant lost during manufacture. As a result, the gum base and chewing gum include at least about two-thirds, and preferably three-fourths, of the amount of antioxidant initially added during manufacture of the gum base. The improved antioxidant retention is accomplished primarily using mixing techniques which significantly reduce the average mixing time needed to prepare a homogeneous gum base, and further by integrating the manufacture of gum base and chewing gum into a single continuous mixer.

43 Claims, 5 Drawing Sheets

OTHER PUBLICATIONS

Brochure—"Production of Chewing Gum And Bubble Gum Masses On the Buss Kneading Extruder", E. Strebel, Buss AG (Mar. 1985).

Swiss Article—"Herstellung Und Aromamatisierung Von Kaugummi Auf Basis Von Saccharose Und Zuckeraustauschstoffen", H. Mueller (Jan. 1981).

Article—"Chewing Gum Formulation", D. Fritz, *The Manufacturing Confectioner* (Sep. 1988).

Article—"Chewing Gum", Axel H. Suck, *H&R Edition* (date unknown).

Buss AG Correspondence of Jan. 2, 1986; Mar. 11, 1986; May 8, 1986 and Jun. 4, 1986 (may refer to other prior art).

"Extrusion: Does Chewing Gum Pass the Taste Test?", *Food Manufacture*, Sep. 1987, pp. 47–50.

"Mixing Process Used In The Manufacture Of Chewing Gum", R. Schilling, Werner & Pfleidener Co. (date unknown).

Letter dated Aug. 22, 1989, including attachment entitled "Buss Extrusion Technology" (1989).

"D-Tex Continuous Compounding Twin—Screw Extruders", by Davis –Standard Co. (updated).

"Farrell–Rockstedt Twin–Screw Extruders", by Farrell Corp. (updated).

"Leistritz Extrusionstechnik: The Universal Laboratory System", by American Leistritz Extruder Corp. (updated).

"Leistritz Extrusionstechnik: The Multi–Extrusion System For Mixing, Kneading And Strandextrusion", by American Leistritz Extruder Corp. (updated).

"Buss Technology For The Continuous Compounding Of Gum Base", by George Fischer of Buss Gruppe (Apr. 22, 1995).

"Buss Technology For The Continuous Compounding Of Chewing Gum And Bubble Gum", by Bernd Rose of Buss Gruppe (Apr. 24, 1995).

"Rubber Extrusion Technology", Feb. 1993, including page entitled Mixing In Extruders.

"The Teledyne Readco Continuous Processor", by Teledyne Readco Co. (date unknown).

U.S. Patent Application Serial No. 08/126,319, filed Sep. 24, 1993 entitled "Continuous Chewing Gum Base Manufacturing Proces Using Highly Distributive Mixing", Inventors Song, et al.

U.S. Patent Application Serial No. 08/136,589, filed Oct. 14, 1993, entitled "Continuous Chewing Gum Base Manufacturing Process Using A Mixing–Restriction Element", Inventors Song, et al.

U.S. Patent Application Serial No. 08/141,281, filed Oct. 22, 1993, entitled "Continuous Gum Base Manufacture Using Paddle Mixing", Inventors Song, et al.

U.S. Patent Application Serial No. 08/305,363, filed Sep. 13, 1994 entitled "Total Chewing Gum Manufactured Using High Efficiency Continuous Mixing", Inventors Song, et al.

J. Argic. Food Chem. 1991, 39, 1063–1069, "Thermal Decomposition Of Some Phenolic Antioxidants", by (Hamama).

Ingredients Extra, Jun. 1994, vol. 7, No. 2 Supplement, "Extrusion Technology For Chewing Gum Production", by (Haarman & Reimer, the Netherlands).

"Buss Kneading Extruder Technology for the Food Industry", Advertising brochure by Buss America Inc. (date unknown).

Buss, Nov. 87, "Extrusion Processing Of Shear–Sensitive Food Products", by Dr. Treiber of Buss AG (Switzerland).

"Buss Extrusion Technology", Advertising brochure by Buss America Inc. (date unknown).

GUM BASE MADE WITH REDUCED ANTIOXIDANT AND METHOD OF PREPARATION

RELATED APPLICATIONS

This application is a continuation-in-part of U.S. application Ser. No. 08/305,363, filed on Sep. 13, 1994, now abandoned, the disclosure of which is incorporated herein by reference.

FIELD OF THE INVENTION

This invention is directed to a gum base having reduced initial antioxidant levels, a method of making gum base which requires less initial antioxidant than conventional methods, and a finished gum base and chewing gum which have normal antioxidant levels but reduced levels of degraded antioxidant by-products.

BACKGROUND OF THE INVENTION

Gum bases, for use in chewing gum, are typically manufactured using antioxidants. The antioxidants must be added at sufficient levels into the gum base to provide stability of a) the gum base ingredients, during manufacture of the gum base; b) the gum base and other chewing gum ingredients, during manufacture of the chewing gum; and c) the finished chewing gum product, during shelf storage.

The most severe conditions requiring antioxidant generally occur during manufacture of the gum base, as a result of the relatively high shear, high temperature and long mixing times required to disperse the elastomer, filler, and other gum base ingredients. For instance, a two hour total mixing time at 280° F. is common for a conventional batch process used to make gum base. Even though the antioxidant is often added late, along with fats and oils, a half hour or more is often required to incorporate the stabilized fats and oils into the base. During this time, much of the antioxidant initially added is often lost due to degradation and volatilization from the heat. This loss may exceed 40% of the initial antioxidant.

Compared to the gum base manufacturing process, the preparation of chewing gum product from gum base and other chewing gum ingredients is much more gentle. Any loss of antioxidant during the later manufacture of chewing gum is generally much less significant, or even negligible, compared to the loss of antioxidant during the initial manufacture of chewing gum base.

The synthetic antioxidants butylated hydroxytoluene (BHT) and butylated hydroxyanisole (BHA) are effective stabilizers for finished chewing gum products at levels of about 10–100 parts per million (ppm). Because the gum base generally constitutes about 10–50% by weight of the chewing gum product, these antioxidants are added at higher concentrations during manufacture of the gum base. During the mixing of the gum base ingredients, these antioxidants partially volatilize or degrade into complex furans, biphenyl compounds, and other unwanted chemicals. The initial addition of antioxidant into the gum base must be sufficiently high to permit these losses as well as the dilution of antioxidant occurring when the gum base is combined with other chewing gum ingredients.

Other synthetic antioxidants, and natural antioxidants, volatilize or degrade to some extent during gum base manufacture. These other antioxidants include, for example, tert-butyl hydroquinone (TBHQ) and tocopherols. In order to minimize the degradation of antioxidant, and reduce the amount of unwanted chemical by-products, there is a demand for a process which efficiently combines the gum base ingredients using less severe conditions.

SUMMARY OF THE INVENTION

The present invention includes a stabilized chewing gum base made using lower initial antioxidant levels than conventional gum bases, and a method of making gum base which causes less volatilization and degradation of antioxidants. The results are a finished gum base which includes a normal level of remaining antioxidant, and less unwanted degradation by-products, compared to conventional finished gum bases, and a corresponding stabilized chewing gum which contains less chemical by-products.

A gum base is prepared initially using an antioxidant in the range of about 10 to about 2000 ppm based on the weight of the gum base. The level used will depend on the particular antioxidant being used, local regulations, shelf life expectations and other factors. The antioxidant may be synthetic or natural, and is preferably selected from BHT, BHA, TBHQ, propyl gallate, or combinations thereof. After the gum base ingredients have been mixed with each other, and combined with other chewing gum ingredients to form a finished product, at least about two-thirds of the initial antioxidant will remain, and will be present in the chewing gum product at about 7 to about 1000 ppm based on the weight of the chewing gum.

The level of the antioxidant present in the finished chewing gum is conventional. The differences are that the starting level of antioxidant added during manufacture of the gum base is lower than in a conventional method, and the percentage of the initial antioxidant remaining in the finished gum base and chewing gum product is higher. Because less antioxidant is lost during processing, especially due to degradation, there is less quantity of unwanted reaction products of the antioxidant. The result is a cleaner, better tasting chewing gum product.

In order to accomplish these objectives, the chewing gum base is prepared using a process which is gentler than conventional batch processes. By "gentler", it is meant that the gum base is made using less mixing time, less temperature, less shear, or some combination of the foregoing. Preferably, the gum base is prepared using a continuous mixer having an average residence time for gum base manufacture of not more than about 20 minutes, and an average gum base mixing temperature of not more than about 140° C. (with a peak mixing temperature of not more than about 160° C.). Preferably, the manufacture of the gum base and chewing gum are integrated into a single efficient continuous mixer.

With the foregoing in mind, it is a feature and advantage of the invention to provide a method of making gum base during which a higher percentage of antioxidant initially added is retained, compared to conventional gum base manufacturing methods.

It is also a feature and advantage of the invention to provide a gum base and corresponding chewing gum in which higher percentages of antioxidant initially added are retained, compared to conventional products.

It is also a feature and advantage of the invention to provide a gum base and chewing gum having normal levels of antioxidant in the finished products, and lower levels of degraded antioxidant chemicals, compared to conventional products.

The foregoing and other features and advantages of the invention will become further apparent from the following detailed description of the presently preferred embodiments, read in conjunction with the accompanying examples and drawings. The detailed description, examples and drawings are intended to be merely illustrative rather than limiting, the scope of the invention being defined by the appended claims and equivalents thereof.

DETAILED DESCRIPTION OF THE PRESENTLY PREFERRED EMBODIMENTS

In accordance with the invention, a gum base and chewing gum are manufactured using one or more antioxidants added during manufacture of the gum base, in such a way that at least about two-thirds of the total antioxidant initially added to the gum base is still present after the chewing gum manufacture has been completed. Preferably, at least about three-fourths of the antioxidant initially added to the gum base is still present in the final chewing gum product. This means that no more than about one-third, and preferably no more than about one-fourth, of the total antioxidant added to the gum base, is volatilized, degraded, or otherwise lost during the manufacture of gum base and chewing gum. This represents a significant improvement over the prior art, in which more than 40% of the antioxidant initially added to the gum base was lost during manufacture of the gum base alone.

The level of antioxidant present in the finished chewing gum made according to the invention is comparable to the levels of antioxidant present in conventional finished chewing gums. Because less antioxidant is lost during manufacture of the gum base, the level of antioxidant initially added to the gum base may be lower for the gum base and chewing gum made according to the invention. Also, the finished chewing gum of the invention has less degraded antioxidant by-products (for example, complex furans and biphenyl compounds) than prior art chewing gums containing the same antioxidant levels. Generally, the level of antioxidant in the finished chewing gum will be about 1–1000 ppm, depending primarily on which antioxidant is used. Preferably, the chewing gum will include about 27–300 ppm antioxidant.

The level of antioxidant initially added to the gum base may be determined based on the level of the particular antioxidant desired in the chewing gum product, the level of gum base to be used in the chewing gum, and the amount of antioxidant lost during manufacture of the gum base and chewing gum. The antioxidant level initially added to the gum base should be about 1–1000 ppm based on the weight of the chewing gum, preferably about 8–300 ppm based on the weight of the chewing gum, to be produced from the gum base. This requires a starting level of about 10–2000 ppm based on the weight of the gum base, preferably about 40–1000 ppm.

It is expected that the amount of antioxidant lost during manufacture of the chewing gum will be small or negligible compared to the amount lost during manufacture of the gum base. Put another way, at least about two-thirds, and preferably at least about three-fourths, of the antioxidant initially added to the gum base will remain after the gum base manufacture has been completed, and will still remain (with only minor variation) after the chewing gum manufacture has been completed. When gum base is prepared separately from chewing gum, the finished gum base should contain about 7 to about 2000 ppm antioxidant, preferably about 27 to about 1000 ppm antioxidant.

The present invention contemplates the use of any commercially acceptable synthetic or natural antioxidant in the chewing gum base. Preferred antioxidants include one or more of BHT, BHA, TBHQ, and propyl gallate. Of these, BHT, BHA and combinations thereof are especially suitable for use with the invention, because there is a desire to reduce the amount of conventional synthetic antioxidants added in chewing gum and, particularly, to reduce their degradation by-products.

In addition to the antioxidant, the gum base includes elastomers, elastomer plasticizers (resins), fats, oils, waxes, softeners and inorganic fillers. The elastomers constitute about 5 to about 95 percent by weight of the base, preferably between 10 and 70 percent by weight and most preferably between 15 and 45 percent by weight. Elastomers may include synthetic elastomers such as polyisobutylene, polybutadiene, isobutylene-isoprene copolymer, styrene-butadiene copolymer, polyvinyl acetate, vinyl acetate-vinyl laureate copolymer, polyethylene, ethylene vinyl acetate, polyvinyl alcohol or mixtures thereof. Elastomers may also include natural elastomers, including natural rubber such as smoked or liquid latex and guayule as well as natural gums such as jelutong, lechi caspi, perillo, massaranduba balata, massaranduba chocolate, nispero, rosindinha, chicle, gutta hang kang or mixtures thereof. Elastomers provide the rubbery, cohesive nature to the gum which varies depending on the elastomer's chemical and physical properties, and how the elastomer is blended with other ingredients. Synthetic elastomers are preferred for use with the present invention.

Elastomer plasticizers modify the finished gum firmness when used in the gum base. Elastomer plasticizers typically constitute from about 0 to about 75 percent by weight of the gum base, preferably 5 to 45 percent by weight and most preferably 10 to 30 percent by weight. Elastomer plasticizers include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, methyl and partially hydrogenated methyl esters of rosin, pentaerythritol ester of rosin or mixtures. Elastomer plasticizers also include synthetics such as terpene resins derived from alpha-pinene, beta-pinene, dipentene or di-limonene, and combinations thereof.

Waxes include synthetic (e.g. polyethylene and Fischer-Tropsch waxes) and natural (candelilla carnauba, beeswax, rice bran or mixtures thereof) and petroleum (e.g. microcrystalline and paraffin). Waxes, when used, generally constitute up to 30 weight percent of the gum base. When used, waxes aid in the curing of finished gum made from the gum base and also help improve the release of flavor, increase the shelf life and improve the chewing texture.

Fillers modify the texture of the gum base and aid processing. Fillers/texturizers include magnesium and calcium carbonate, ground limestone and silicate types such as magnesium and aluminum silicate, clay, alumina, talc as well as titanium oxide, mono-, di- and tricalcium phosphate, cellulose polymers such as ethylcellulose and methylcellulose, wood, or mixtures thereof. The filler typically comprises about 1 to about 60 percent by weight of the gum base. Gum bases which utilize acidic ingredients preferably contain a filler that is inert to acids, most preferably talc.

Softeners and emulsifiers modify the texture and cause the hydrophobic and hydrophilic components of the gum base and chewing gum to become more miscible. Softeners/emulsifiers include tallow, hydrogenated tallow, lard, hydrogenated and partially hydrogenated vegetable oils, cocoa butter, glycerol monostearate, glycerol triacetate, lecithin, mono-, di- and triglycerides, acetylated mono-, di- and triglycerides, distilled mono-, di- and triglycerides, and fatty acids (e.g. stearic, palmitic, oleic, linoleic and linolenic acids) or mixtures thereof. Softeners/emulsifiers generally constitute between 0.5 and 40 weight percent of the gum base.

Colorants and whiteners impart desired color or remove undesired color by whitening the base and/or the chewing gum. Colorants and whiteners include FD&C type lakes, plant extracts, titanium dioxide or mixtures thereof.

The gum base constitutes about 5–95% by weight of the chewing gum, preferably about 10–50% by weight of the chewing gum, most preferably about 20–30% by weight of the chewing gum. In addition to the gum base, which is generally water-insoluble, the chewing gum includes a water-soluble bulk portion and one or more flavoring agents. The water-soluble portion dissipates over a period of time during chewing. The gum base remains in the mouth throughout the chewing process.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.2–5% by weight of the chewing gum, most preferably between about 0.5–3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

In accordance with the invention, the gum base should be made using a continuous mixer. The average mixer residence time used to complete the manufacture of the gum base should be no more than about 45 minutes, preferably no more than about 30 minutes, most preferably about 20 minutes or less. Also, the average mixer temperature used to manufacture the gum base should be no more than about 140° C., preferably no more than about 125° C. By so limiting the average residence time and temperature, the volatilization and degradation of antioxidants added during manufacture of the gum base can be minimized.

In order to minimize the residence time, the continuous mixer should be capable of providing thorough mixing of the gum base ingredients, to form a homogeneous gum base, using a relatively short distance or length of the mixer. This distance can be expressed as a ratio of the length of a particular active region of the mixer screw, which is composed of mixing elements, divided by the maximum diameter of the mixer barrel in this active region. This ratio is abbreviated as L/D.

The method of the invention contemplates that the gum base manufacture should be performed using an L/D of not more than about 40. This means that the gum base ingredients are added to the continuous mixer and blended to a homogeneous mass using an L/D of not more than about 40. Preferably, the gum base should be made using a mixing L/D of not more than about 30, most preferably not more than about 20.

A variety of continuous mixers can be properly configured to manufacture the gum base in accordance with the invention. The continuous mixer may be a properly configured twin screw extruder (with corotating or counterrotating screws), a single screw extruder, a blade-and-pin mixer, or another continuous mixing apparatus. One particularly suitable continuous mixer is a high efficiency blade-and-pin mixer as described further herein. Another very suitable mixer for making the gum base is a ZSK58 corotating twin-screw extruder available from Werner-Pfleiderer Corp. in Ramsey, N.J.

In a preferred embodiment, the manufacture of the gum base, and the combining of the gum base with the remaining chewing gum ingredients, are both performed in a single integrated high efficiency continuous mixing process. When the manufacture of gum base and chewing gum are so integrated, the method of the invention comprises performing the following steps in a single continuous mixer:

a) adding and thoroughly mixing at least a portion of the chewing gum base ingredients (elastomer, elastomer plasticizer, filler, etc.) in a continuous mixer, using an L/D of not more than about 25;

b) adding at least a portion of the remaining (non-base) chewing gum ingredients (sweeteners, flavors, softeners, etc.), and thoroughly mixing these ingredients with the gum base in the same mixer, using an L/D of not more than about 15; and c) sufficiently completing the entire addition and mixing operation in the same mixer, so that the ingredients exist as a substantially homogeneous chewing gum mass, using a total L/D of not more than about 40.

When performing the above integrated method, it is preferred that the gum base ingredients be completely added and mixed upstream from the remaining chewing gum ingredients, and that the remaining ingredients be completely added downstream for mixing with the already blended gum base. However, the invention also includes those variations wherein a portion of the gum base ingredients may be added downstream with or after some of the remaining ingredients, and/or wherein a portion of the remaining (non-base) ingredients are added upstream with or before some of the base ingredients. The important feature is that a substantially homogeneous chewing gum product mass be formed in a single continuous mixer, using an L/D of not more than about 40.

When performing the integrated method to make gum base and chewing gum in a single mixer, a blade-and-pin mixer can be used. A blade-and-pin mixer, exemplified in FIG. 1, uses a combination of selectively configured rotating mixer blades and stationary barrel pins to provide efficient mixing over a relatively short distance. A commercially available blade-and-pin mixer is the Buss kneader, manufactured by Buss AG in Switzerland, and available from Buss America, located in Bloomingdale, Ill.

Figure 1:
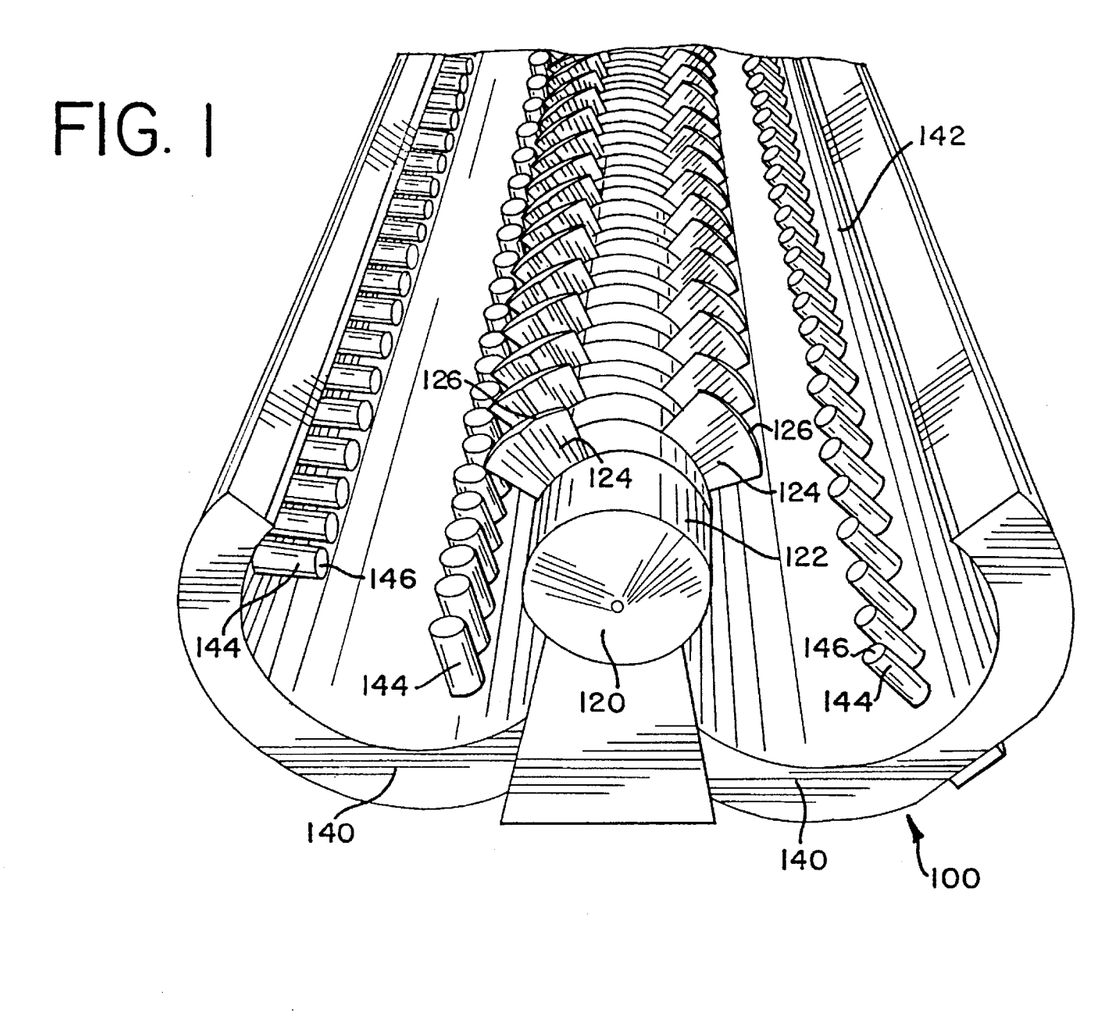
FIG. 1 is a partial exploded perspective view of a preferred Buss high efficiency continuous mixer used to practice the method of the invention, illustrating a mixing barrel and mixing screw arrangement.

Referring to FIG. 1, a presently preferred blade-and-pin mixer 100 includes a single mixing screw 120 turning inside a barrel 140 which, during use, is generally closed and completely surrounds the mixing screw 120. The mixing screw 120 includes a generally cylindrical shaft 122 and three rows of mixing blades 124 arranged at evenly spaced locations around the screw shaft 122 (with only two of the rows being visible in FIG. 1). The mixing blades 124 protrude radially outward from the shaft 122, with each one resembling the blade of an axe.

The mixing barrel 140 includes an inner barrel housing 142 which is generally cylindrical when the barrel 140 is closed around the screw 120 during operation of the mixer 100. Three rows of stationary pins 144 are arranged at evenly spaced locations around the barrel housing 142, and protrude radially inward from the barrel housing 142. The pins 144 are generally cylindrical in shape, and may have rounded or bevelled ends 146.

The mixing screw 120 with blades 124 rotates inside the barrel 140 and is driven by a variable speed motor (not shown). During rotation, the mixing screw 120 also moves back and forth in an axial direction, creating a combination of rotational and axial mixing which is highly efficient. During mixing, the mixing blades 124 continually pass between the stationary pins 144, yet the blades and the pins never touch each other. Also, the radial edges 126 of the blades 124 never touch the barrel inner surface 142, and the ends 146 of the pins 144 never touch the mixing region shaft 122.

FIGS. 2–6 illustrate various screw elements which can be used to configure the mixing screw 120 for optimum use. FIGS. 2A and 2B illustrate on-screw elements 20 and 21 which are used in conjunction with a restriction ring assembly. The on-screw elements 20 and 21 each include a cylindrical outer surface 22, a plurality of blades 24 projecting outward from the surface 22, and an inner opening 26 with a keyway 28 for receiving and engaging a mixing screw shaft (not shown). The second on-screw element 21 is about twice as long as the first on-screw element 20.

Figure 2A:
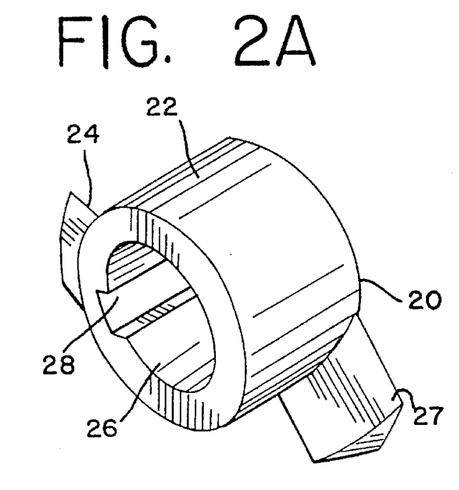
FIG. 2A is a perspective view of an on-screw element used on the upstream side of a restriction ring assembly, in the presently preferred high efficiency mixer configuration.
Figure 2B:
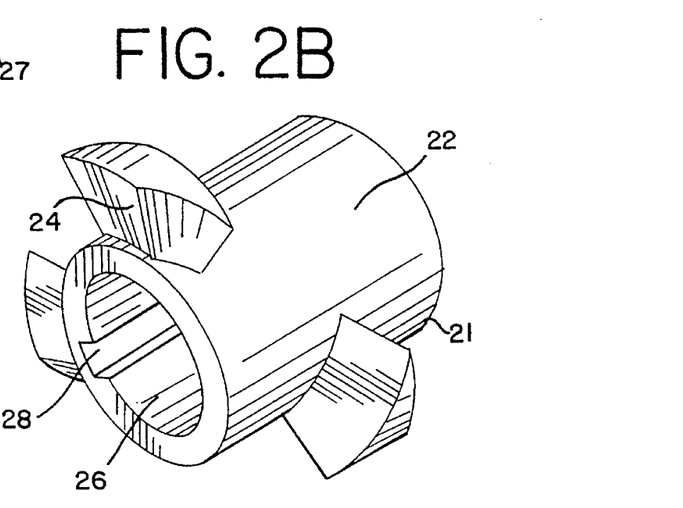
FIG. 2B is a perspective view of an on-screw element used on the downstream side of the restriction ring assembly in the presently preferred high efficiency mixer configuration.
Figure 2C:
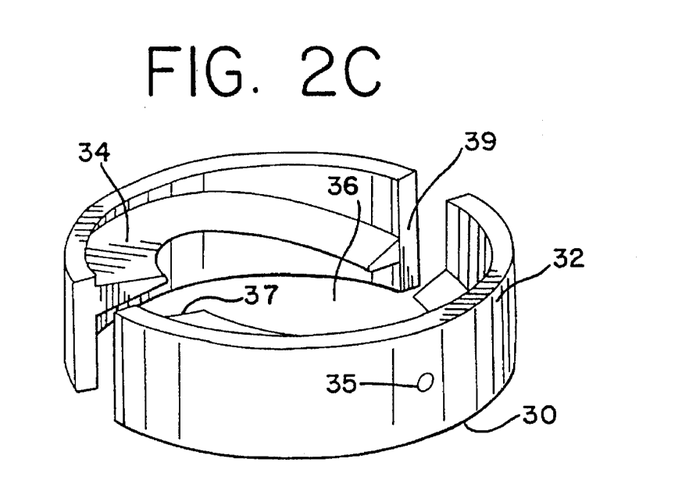
FIG. 2C is a perspective view of a restriction ring assembly used in the presently preferred high efficiency mixer configuration.

FIG. 2C illustrates a restriction ring assembly 30 used to build back pressure at selected locations along the mixing screw 120. The restriction ring assembly 30 includes two halves 37 and 39 mounted to the barrel housing 142, which halves engage during use to form a closed ring. The restriction ring assembly 30 includes a circular outer rim 32, an inner ring 34 angled as shown, and an opening 36 in the inner ring which receives, but does not touch, the on-screw elements 20 and 21 mounted to the screw shaft. Mounting openings 35 in the surface 32 of both halves of the restriction ring assembly 30 are used to mount the halves to the barrel housing 142.

Figure 3:
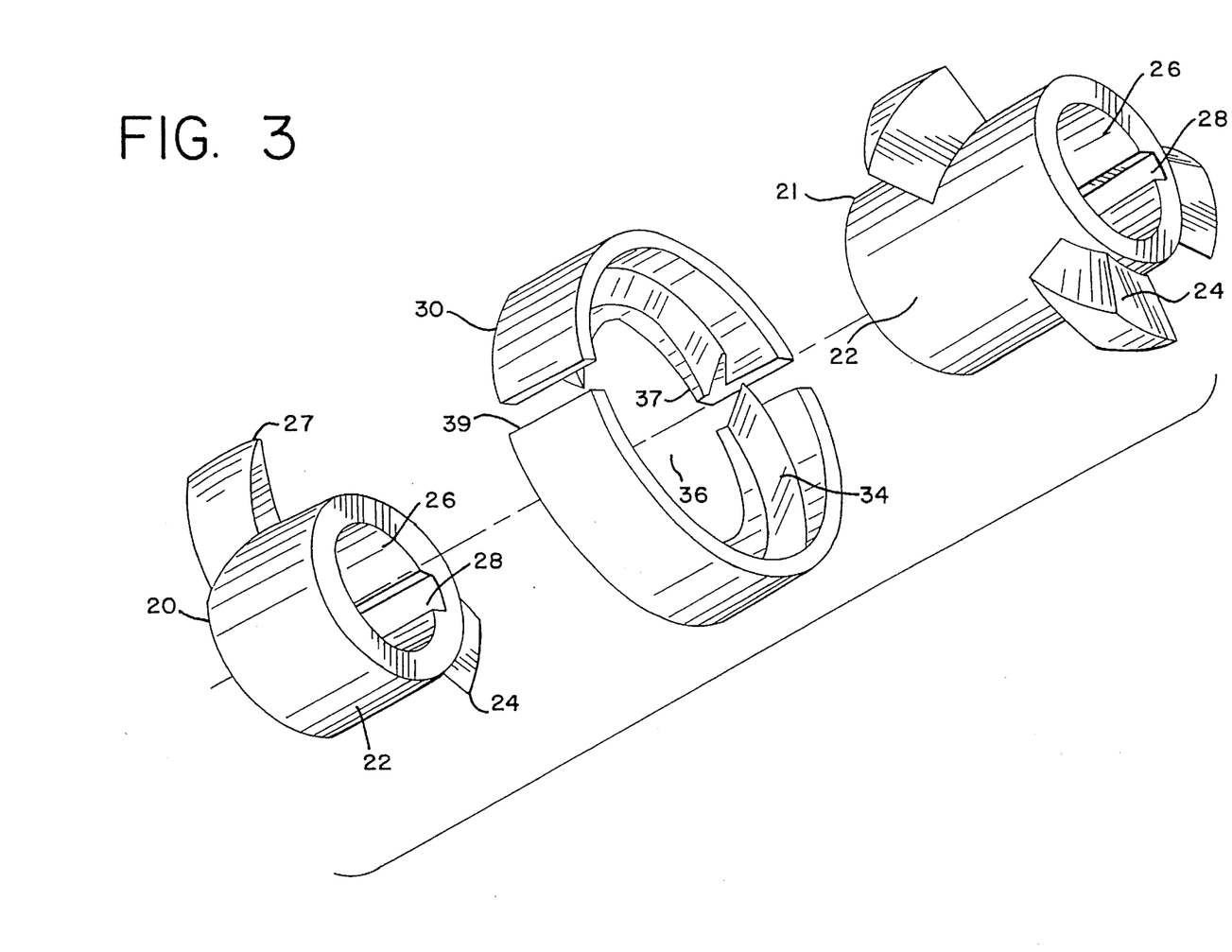
FIG. 3 is a perspective view showing the relative positioning of the elements of FIGS. 2A, 2B and 2C in the presently preferred high efficiency mixer configuration.

FIG. 3 illustrates the relationship between the restriction ring assembly 30 and the on-screw elements 20 and 21 during operation. When the mixing screw 120 is turning inside the barrel 140, and reciprocating axially, the clearances between the on-screw elements 20 and 21 and the inner ring 34 provide the primary means of passage of material from one side of the restriction ring assembly 30 to the other. The on-screw element 20 on the upstream side of the restriction ring assembly includes a modified blade 27 permitting clearance of the inner ring 34. The other on-screw element 21 is placed generally downstream of the restriction ring assembly 30, and has an end blade (not visible) which moves close to and wipes the opposite surface of the inner ring 34.

The clearances between outer surfaces 22 of the on-screw elements 20 and 21 and the inner ring 34 of the restriction ring assembly 30, which can vary and preferably are on the order of 1–5 mm, determine to a large extent how much pressure build-up will occur in the upstream region of the restriction ring assembly 30 during operation of the mixer 100. It should be noted that the upstream on-screw element 20 has an L/D of about ⅓, and the downstream on-screw element 21 has an L/D of about ⅔, resulting in a total L/D of about 1.0 for the on-screw elements. The restriction ring assembly 30 has a smaller L/D of about 0.45 which coincides with the L/D of on-screw elements 20 and 21, which engage each other but do not touch the restriction ring assembly.

Figure 4:
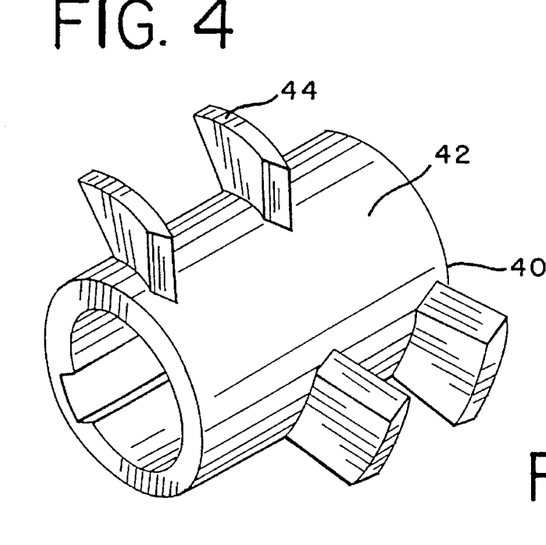
FIG. 4 is a perspective view of a low-shear mixing screw element used in the presently preferred high efficiency mixer configuration.
Figure 5:
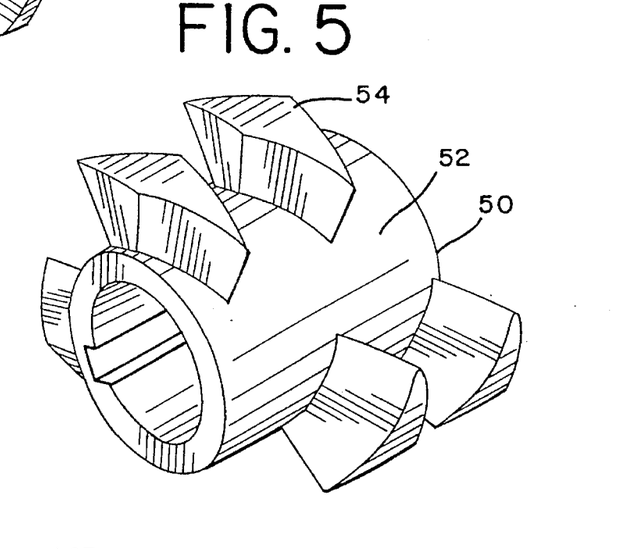
FIG. 5 is a perspective view of a high-shear mixing screw element used in the presently preferred high efficiency mixer configuration.

FIGS. 4 and 5 illustrate the mixing or "kneading" elements which perform most of the mixing work. The primary difference between the lower shear mixing element 40 of FIG. 4 and the higher shear mixing element 50 of FIG. 5 is the size of the mixing blades which project outward on the mixing elements. In FIG. 5, the higher shear mixing blades 54 which project outward from the surface 52 are larger and thicker than the lower shear mixing blades 44 projecting outward from the surface 42 in FIG. 4. For each of the mixing elements 40 and 50, the mixing blades are arranged in three circumferentially-spaced rows, as explained above with respect to FIG. 1. The use of thicker mixing blades 54 in FIG. 5 means that there is less axial distance between the blades and also less clearance between the blades 54 and the stationary pins 144 as the screw 120 rotates and reciprocates axially (FIG. 1). This reduction in clearance causes inherently higher shear in the vicinity of the mixing elements 50.

Figure 6:
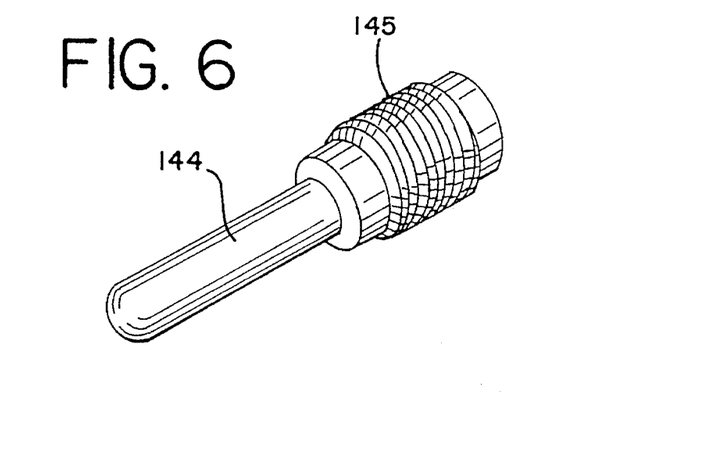
FIG. 6 is a perspective view of a barrel pin element used in the presently preferred high efficiency mixer configuration.

FIG. 6 illustrates a single stationary pin 144 detached from the barrel 140. The pin 144 includes a threaded base 145 which permits attachment at selected locations along the inner barrel shaft 142. It is also possible to configure some of the pins 144 as liquid injection ports by providing them with hollow center openings.

Figure 7:
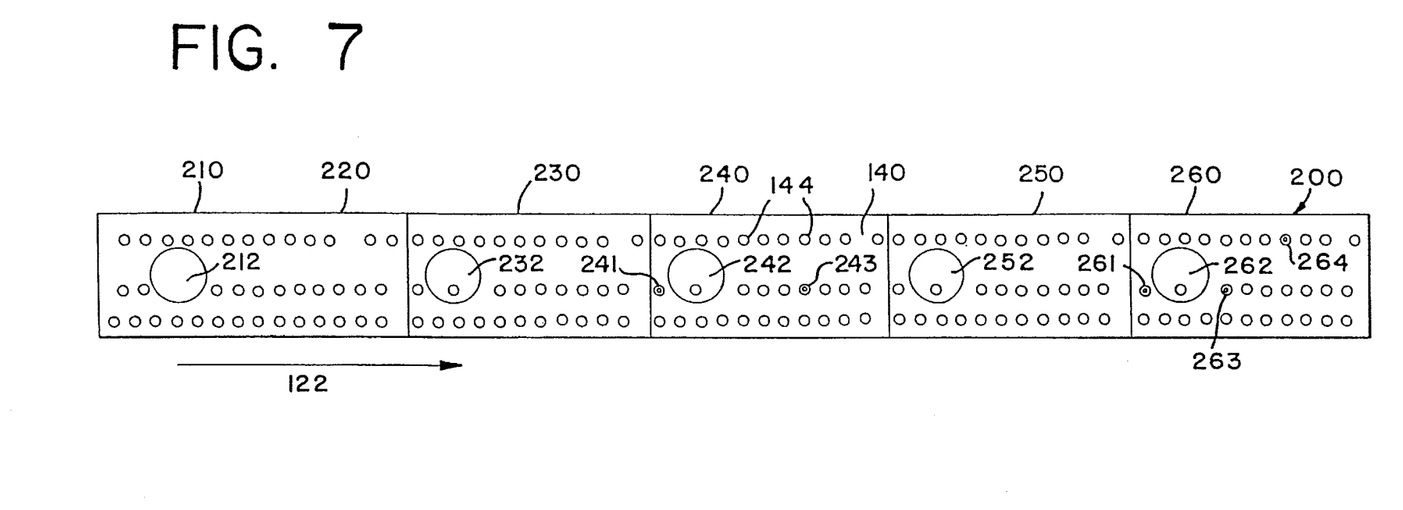
FIG. 7 is a schematic diagram of a presently preferred arrangement of mixing barrel pins and ingredient feed ports used to practice the method of the invention.
Figure 8:
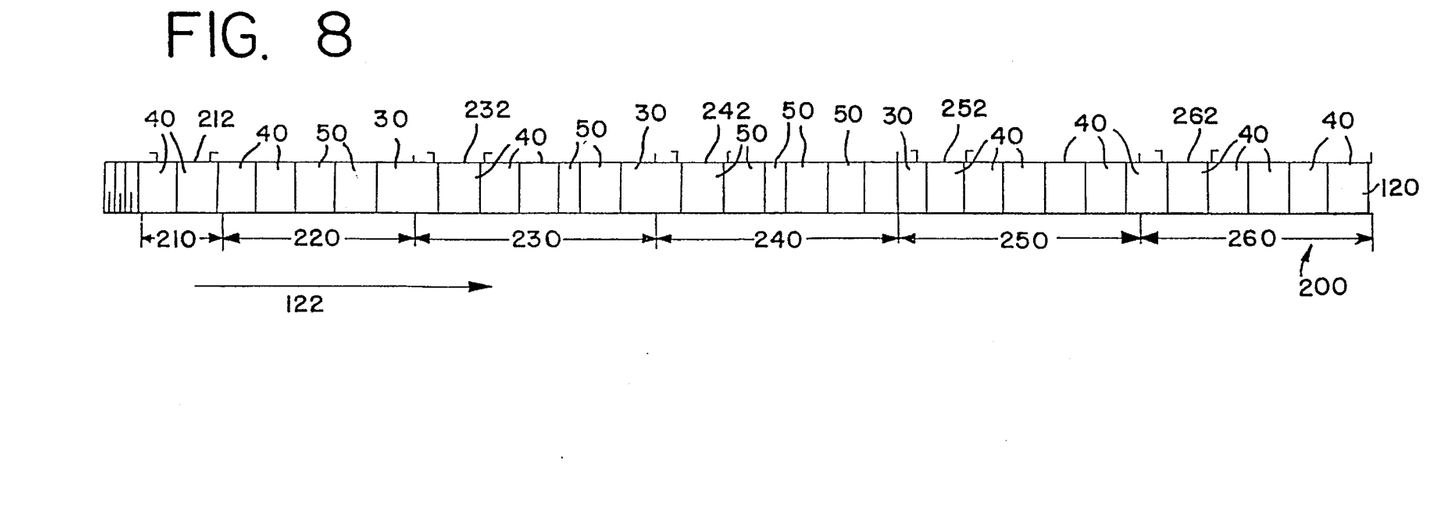
FIG. 8 is a schematic diagram of a presently preferred mixing screw configuration used to practice the method of the invention.

FIG. 7 is a schematic view showing the presently preferred barrel configuration, including the presently preferred arrangement of barrel pins 144. FIG. 8 is a corresponding schematic view illustrating the presently preferred mixing screw configuration. The mixer 200 whose preferred configuration is illustrated in FIGS. 7 and 8 has an overall active mixing L/D of about 19.

The mixer 200 includes an initial feed zone 210 and five mixing zones 220, 230, 240, 250 and 260. The zones 210, 230, 240, 250 and 260 include five possible large feed ports 212, 232, 242, 252 and 262, respectively, which can be used to add major (e.g. solid) ingredients to the mixer 200. The zones 240 and 260 are also configured with five smaller liquid injection ports 241, 243, 261, 263 and 264 which can be used to add liquid ingredients. The liquid injection ports 241, 243, 261, 263 and 264 include special barrel pins 144 formed with hollow centers, as explained above.

Referring to FIG. 7, barrel pins 144 are preferably present in most or all of the available locations, in all three rows as shown.

Referring to FIG. 8, the presently preferred configuration of the mixing screw 120 for most chewing gum products is schematically illustrated as follows. Zone 210, which is the initial feed zone, is configured with about 1⅓ L/D of low shear elements, such as the element 40 shown in FIG. 4. The L/D of the initial feed zone 210 is not counted as part of the overall active mixing L/D of 19, discussed above, because its purpose is merely to convey ingredients into the mixing zones.

The first mixing zone 220 is configured, from left to right (FIG. 8), with two low shear mixing elements 40 (FIG. 4) followed by two high shear elements 50 (FIG. 5). The two low shear mixing elements contribute about 1⅓ L/D of mixing, and the two high shear mixing elements contribute about 1⅔ L/D of mixing. Zone 220 has a total mixing L/D of about 3.0, including the end part covered by a 57 mm restriction ring assembly 30 with cooperating on-screw elements 20 and 21 (not separately designated in FIG. 8).

The restriction ring assembly 30 with cooperating on-screw elements 20 and 21, straddling the end of the first mixing zone 220 and the start of the second mixing zone 230, have a combined L/D of about 1.0, part of which is in the second mixing zone 230. Then, zone 230 is configured, from left to right, with three low shear mixing elements 40 and 1.5 high shear mixing elements 50. The three low shear mixing elements contribute about 2.0 L/D of mixing, and the 1.5 high shear mixing elements contribute about 1.0 L/D of mixing. Zone 230 has a total mixing L/D of about 4.0.

Straddling the end of the second mixing zone 230 and the start of the third mixing zone 240 is a 60 mm restriction ring assembly 30 with cooperating on-screw elements 20 and 21, contributing a combined L/D of about 1.0. Then, zone 240 is configured, from left to right, with 4.5 high shear mixing elements 50 contributing a mixing L/D of about 3.0. Zone 240 also has a total mixing L/D of about 4.0.

Straddling the end of the third mixing zone 240 and the start of the fourth mixing zone 250 is another 60 mm restriction ring assembly 30 with cooperating on-screw elements 20 and 21, contributing a combined L/D of about 1.0. Then, the remainder of the fourth mixing zone 250 and the fifth mixing zone 260 are configured with eleven low shear mixing elements 40 contributing a mixing L/D of about 7⅓. Zone 250 has a total mixing L/D of about 4.0, and zone 260 has a total mixing L/D of about 4.0.

As stated above, it is generally preferred that the gum base and ultimate chewing gum product are made continuously in the same mixer. Generally, the gum base portion is made using a mixing L/D of about 25 or less, preferably about 20 or less, most preferably about 15 or less. Then, the remaining chewing gum ingredients are combined with the gum base to make a chewing gum product using a mixing L/D of about 15 or less, preferably about 10 or less, most preferably about 5 or less. The mixing of the gum base ingredients and the remaining chewing gum ingredients may occur in distinct parts of the same mixer or may overlap, so long as the total mixing is achieved using an L/D of about 40 or less, preferably about 30 or less, most preferably about 20 or less.

When the preferred blade-and-pin mixer is used, having the preferred configuration described about, the total chewing gum can be made using a mixing L/D of about 19. The gum base can be made using an L/D of about 15 or less, and the remaining gum ingredients can be combined with the gum base using a further L/D of about 5 or less.

In order to minimize the shear and, thus, minimize the volatilization and degradation of an antioxidant using the preferred blade-and-pin mixer 200, it is advantageous to maintain the rpm of the mixing screw 120 at less than about 150, preferably less than about 100. Also, the mixer temperature is preferably optimized so that the gum base is at about 130° F. or lower when it initially meets the other chewing gum ingredients, and the chewing gum product is about 130° F. or lower (preferably 125° F. or lower) when it exits the mixer. This temperature optimization can be accomplished, in part, by selectively heating and/or water cooling the barrel sections surrounding the mixing zones 220, 230, 240, 250 and 260.

In order to manufacture the gum base, the following preferred procedure can be followed. The elastomer, filler, and at least some of the elastomer solvent are added to the first large feed port 212 in the feed zone 210 of the mixer 200, and are subjected to efficient dispersive mixing in the first mixing zone 220 while being conveyed in the direction of the arrow 122. The remaining elastomer solvent (if any) and polyvinyl acetate are added to the second large feed port 232 in the second mixing zone 230, and the ingredients are subjected to a more distributive mixing in the remainder of the mixing zone 230.

Fats, oils, waxes (if used), emulsifiers, colors and antioxidants are added to the liquid injection ports 241 and 243 in the third mixing zone 240, and the ingredients are subjected to distributive mixing in the mixing zone 240 while being conveyed in the direction of the arrow 122. At this point, the gum base manufacture should be complete, and the gum base should leave the third mixing zone 240 as a substantially homogeneous, lump-free compound with a uniform color. At this point, at least about two-thirds and, preferably, at least about three-fourths of the antioxidant initially added, should still remain in the base.

The fourth mixing zone 250 is used primarily to cool the gum base, although minor ingredient addition may be accomplished. Then, to manufacture the final chewing gum product, glycerin, corn syrup, other bulk sugar sweeteners, high intensity sweeteners, and flavors can be added to the fifth mixing zone 260, and the ingredients are subjected to distributive mixing. If the gum product is to be sugarless, hydrogenated starch hydrolyzate or sorbitol solution can be substituted for the corn syrup and powdered alditols can be substituted for the sugars.

Preferably, glycerin is added to the first liquid injection port 261 in the fifth mixing zone 260. Solid ingredients (bulk sweeteners, encapsulated high intensity sweeteners, etc.) are added to the large feed port 262. Syrups (corn syrup, hydrogenated starch hydrolyzate, sorbitol solution, etc.) are added to the next liquid injection port 263, and flavors are added to the final liquid injection port 264. Flavors can alternatively be added at ports 261 and 263 in order to help plasticize the gum base, thereby reducing the temperature and torque on the screw. This may permit running of the mixer at higher rpm and throughput.

The gum ingredients are compounded to a homogeneous mass which is discharged from the mixer as a continuous stream or "rope". The continuous stream or rope can be deposited onto a moving conveyor and carried to a forming station, where the gum is shaped into the desired form such as by pressing it into sheets, scoring, and cutting into sticks. Because the entire gum manufacturing process is integrated into a single continuous mixer, there is less variation in the product, and the product is cleaner and more stable due to its simplified mechanical and thermal histories. Because there is very little antioxidant loss during the chewing gum manufacturing stage, the final product should still contain at least about two-thirds and, preferably, at least about three-fourths of the antioxidant added during manufacture of the gum base.

A wide range of changes and modifications to the preferred embodiments of the invention will be apparent to persons skilled in the art. The above preferred embodiments, and the examples which follow, are merely illustrative of the invention and should not be construed as imposing limitations on the invention. For instance, different continuous mixing equipment and different mixer configurations can be used without departing from the invention as long as the preparation of a chewing gum base is accomplished in an efficient continuous mixer using a mixing L/D of not more than about 40.

EXAMPLE 1 (COMPARATIVE)

The following gum base composition was prepared using a conventional batch process:

| Ingredient | % By Weight |
| --- | --- |
| Butyl Rubber (shredded) | 9.89 |
| Calcium Carbonate | 13.19 |
| Polyvinyl Acetate (Mol. Wt. = 25,000) | 21.77 |
| Polyisobutylene | 15.83 |
| Cocoa Powder | 0.50 |
| Glycerol Monostearate | 2.64 |
| Hydrogenated Cottonseed Oil | 13.19 |
| Hydrogenated Soybean Oil | 13.19 |
| Partially Hydrogenated Soybean & Palm Oil | 9.76 |
| BHT | 0.04 |
| TOTAL | 100.0 |

The foregoing composition was made using a Werner-Pfleiderer dual sigma blade mixer having a 757-pound batch size. The mixer was run using front and rear blade speeds of 48.8 and 33.8 rpm and was heated with 45 psi steam. The total mixing time for making the batch was 135 minutes.

The butyl rubber, calcium carbonate, polyvinyl acetate, polyisobutylene and cocoa powder were added to the batch mixer and blended during the first 75 minutes. The hydrogenated soybean oil was added at 75 minutes and blended with the above ingredients. As mixing continued, the hydrogenated cottonseed oil was added at 90 minutes. The BHT, glycerol monostearate and partially hydrogenated soybean and palm oil were all added at 105 minutes, after which all the ingredients were blended for an additional 30 minutes.

Analytical testing of the finished gum base showed BHT present at a level of 232 ppm. This represented a 42% loss from the 400 ppm BHT initially added. One month later, the gum base was tested again, and the BHT was detected at 223 ppm.

The following chewing gum composition was made from the above gum base using a laboratory batch mixing process.

| Ingredient | % By Weight |
| --- | --- |
| Sugar | 64.4 |
| Gum Base | 20.0 |
| Corn Syrup | 13.3 |
| Sorbitol | 0.9 |
| Glycerin | 0.7 |
| Peppermint Flavor | 0.7 |
| TOTAL | 100.0 |

Analytical testing of the finished chewing gum showed BHT present at 43.7 ppm, possibly indicating a slight additional loss during the mixing of chewing gum. The total BHT loss for both phases of production was 45%.

EXAMPLE 2

The same chewing gum product composition of Example 1 was manufactured using a Buss kneader with a 100 mm screw diameter, configured in the preferred manner described above for integrated manufacture of the gum base and chewing gum in a single continuous mixer. As described above, the mixer was configured with five mixing zones, a total mixing L/D of 19, and an initial conveying L/D of 1⅓. No die was used at the end of the mixer, and the chewing gum product exited as a continuous rope. The example was designed to yield a production rate of about 300.1 pounds per hour finished gum.

Liquid ingredients were fed using volumetric pumps into the large feed ports and/or smaller liquid injection ports generally positioned as described above, unless otherwise indicated. The pumps were appropriately sized and adjusted to achieve the desired feed rates.

Dry ingredients were added using gravimetric screw feeders into the large addition ports positioned as described above. Again, the feeders were appropriately sized and adjusted to achieve the desired feed rates.

Temperature control was accomplished by circulating fluids through jackets surrounding each mixing barrel zone and inside the mixing screw. Water cooling was used where temperatures did not exceed 100° C., and oil cooling was used at higher temperatures. Where water cooling was desired, tap water (typically at about 55° F.) was used without additional chilling.

Temperatures were recorded for both the fluid and the ingredient mixture. Fluid temperatures were set for each barrel mixing zone (corresponding to zones 220, 230, 240, 250 and 260 in FIGS. 7 and 8), and are reported below as Z1, Z2, Z3, Z4 and Z5, respectively. Fluid temperatures were also set for the mixing screw 120, and are reported below as S1.

Actual mixture temperatures were recorded near the downstream end of mixing zones 220, 230, 240 and 250; near the middle of mixing zone 260; and near the end of mixing zone 260. These mixture temperatures are reported below as T1, T2, T3, T4, T5 and T6, respectively. Actual mixture temperatures are influenced by the temperatures of the circulating fluid, the heat exchange properties of the mixture and surrounding barrel, and the mechanical heating from the mixing process, and often differ from the set temperatures due to the additional factors.

All ingredients were added to the continuous mixer at ambient temperatures (about 77° F.) unless otherwise noted.

For this run, the zone temperatures Z1–Z5 were set (in °F.) at 350, 350, 300, 78 and 78, respectively. The screw temperature S1 was set at 150° F. Actual mixture temperatures (T1–T6, °F.) were measured, at steady state, as 325, 293, 256, 127, 114 and 115, respectively. The screw rotation was 90 rpm.

A dry mixture of 57% butyl rubber and 43% calcium carbonate was added, at 13.9 pounds per hour, into the first large feed port (port 212 in FIGS. 7 and 8). Polyisobutylene, preheated to 100° C., was also added at 9.5 pounds per hour into this port.

Low molecular weight polyvinyl acetate (weight average Mol. Wt.=25,000) was added at 13.0 pounds per hour into the second large feed port 232. Cocoa powder was also added at 0.3 pounds per hour into this port.

A mixture of 0.1% BHT, 34.0% hydrogenated cottonseed oil, 34.0% hydrogenated soybean oil, 6.7% glycerol monostearate and 25.2% partially hydrogenated soybean and palm oil was preheated to about 80°–90° C. for about 1.5 hours before the start of the run. During the run, this mixture was injected into two liquid injection ports 241 and 243 in the third mixing zone 240, at a total rate of 23.3 pounds per hour. This resulted in an initial BHT concentration of 77.6 ppm based on the weight of the chewing gum, comparable to the 80 ppm used for Example 1.

Glycerin was injected at 2.1 pounds per hour into liquid injection port 261 in the fifth mixing zone 260.

A mixture of 98.6% sugar and 1.4% sorbitol was added at 196 pounds per hour into the feed port 262 in the mixing zone 260.

Corn syrup (at about 40° C.) was injected at 39.9 pounds per hour into liquid injection port 263 in zone 260. Peppermint flavor was injected at 2.1 pounds per hour into liquid injection port 264 in zone 260.

The chewing gum product, which exited at a temperature of about 50° C., was judged to be of acceptable quality. Analytical testing showed the final product to contain BHT at a level of 59.6 ppm, versus the 77.6 ppm that was initially added. This represented only a 23% loss in BHT during the integrated manufacture of the gum base and chewing gum, far less than the 45% loss experienced in Example 1, when the gum base and chewing gum were prepared using conventional techniques.

EXAMPLE 3

As explained above, Example 2 was performed using the same starting level of BHT as Example 1. Because the BHT loss during production of the gum base and chewing gum was substantially less for Example 2 than for Example 1, the finished product of Example 2 had a higher BHT content than the finished product of Example 1. In order to provide a product using the method of Example 2 which has a BHT content of only 43.7 ppm (to match the product of Example 1), it would be necessary to perform the method of Example 2 using a lower starting quantity of BHT.

Given that the method of Example 2 resulted in a 23% loss of BHT, the desired starting quantity can be determined by dividing the target end quantity by the fraction of initial BHT expected to remain after manufacture:

$$\frac{43.7 \text{ ppm}}{(1.00 - .23)} = 56.8 \text{ ppm}$$

Thus, the starting quantity of BHT should be 56.8 ppm based on the production rate of the chewing gum. At a production rate of 300.1 pounds per hour, the BHT should be initially added to the mixer at 0.0170 pounds per hour. Instead of combining 0.1% BHT into the preheated mixture of BHT and oils which is added via injection ports 241 and 243, the preheated mixture need only contain about 0.073% BHT.

It should be appreciated that the method of the present invention is capable of being incorporated in the form of a variety of embodiments, only a few of which have been illustrated and described above. The invention may be embodied in other forms without departing from its spirit or essential characteristics. It will be appreciated that the addition of certain other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A continuously produced chewing gum base using an initial quantity of antioxidant, the chewing gum base comprising:

about 5–95% by weight elastomer;

0 to about 45% by weight elastomer plasticizer;

0 to about 30% by weight wax;

about 1–60% by weight filler;

about 0.5–40% by weight softener/emulsifier; and about 7 to about 2000 ppm antioxidant;

whereby the amount of antioxidant remaining in the gum base is at least about two-thirds of the initial quantity of antioxidant added during produced of the gum base thereby reflecting minimal degradation of the antioxidant and resulting by-products.

2. The chewing gum base of claim 1, wherein the amount of antioxidant remaining in the gum base is at least about three-fourths of the initial quantity of antioxidant added during manufacture of the gum base.

3. The chewing gum base of claim 1, wherein the antioxidant comprises a synthetic antioxidant selected from the group consisting of BHA, BHT, TBHQ, propyl gallate, and combinations thereof.

4. The chewing gum base of claim 3, wherein the antioxidant comprises BHT.

5. The chewing gum base of claim 3, wherein the antioxidant comprises BHA.

6. The chewing gum base of claim 3, wherein the antioxidant comprises BHT and BHA.

7. The chewing gum base of claim 1, wherein the antioxidant is present at about 27 to about 1000 ppm of the gum base.

8. A chewing gum including the chewing gum base of claim 1.

9. A continuously produced chewing gum, comprising:

about 5–95% by weight chewing gum base manufactured using an initial quantity of antioxidant;

about 5–95% by weight bulk sweetener;

about 0.1–15% by weight flavoring agent; and about 1–1000 ppm antioxidant contributed by the chewing gum base;

whereby the amount of antioxidant remaining present in the chewing gum is at least about two-thirds of the initial quantity of antioxidant added during production of the gum base thereby reflecting minimal degradation of the antioxidant and resulting by-products.

10. The chewing gum of claim 9, wherein the amount of antioxidant present in the chewing gum is at least about three-fourths of the initial quantity of antioxidant added during manufacture of the gum base.

11. The chewing gum of claim 9, wherein the antioxidant comprises a synthetic antioxidant selected from the group consisting of BHA, BHT, TBHQ, propyl gallate, and combinations thereof.

12. The chewing gum of claim 11, wherein the antioxidant comprises BHT.

13. The chewing gum of claim 11, wherein the antioxidant comprises BHA.

14. The chewing gum of claim 11, wherein the antioxidant comprises BHT and BHA.

15. The chewing gum of claim 9, wherein the antioxidant is present at about 8 to about 300 ppm of the chewing gum.

16. A method of making a chewing gum base, comprising the steps of:

adding, to a continuous mixer, about 5–95% by weight elastomer, 0 to about 45% by weight elastomer plasticizer, 0 to about 30% by weight wax, about 1–60% by weight filler, about 0.5–40% by weight softener/emulsifier, and about 10–2000 ppm antioxidant; and blending the ingredients together in the continuous mixer to form a gum base;

whereby the amount of antioxidant remaining in the gum base is at least about two-thirds of the amount of antioxidant initially added to the continuous mixer thereby reflecting minimal degradation of the antioxidant and resulting by-products.

17. The method of claim 16, wherein the continuous mixer comprises a blade-and-pin mixer.

18. The method of claim 16, wherein the continuous mixer comprises a corotating twin-screw extruder.

19. The method of claim 16, wherein the continuous mixer comprises a counterrotating twin-screw extruder.

20. The method of claim 16, wherein the amount of antioxidant present in the gum base is at least about three-fourths of the amount of antioxidant added to the continuous mixer.

21. The method of claim 16, wherein the antioxidant comprises a synthetic antioxidant.

22. The method of claim 21, wherein the antioxidant comprises BHT.

23. The method of claim 21, wherein the antioxidant comprises BHA.

24. The method of claim 21, wherein the antioxidant comprises BHT and BHA.

25. An integrated method of making stabilized gum base and chewing gum, comprising the steps of:

preparing stabilized gum base in a continuous mixer using an amount of antioxidant initially added to the continuous mixer;

adding sweetener, softener and flavor to the gum base in the continuous mixer; and mixing the sweetener, softener and flavor with the stabilized gum base in the continuous mixer to provide stabilized chewing gum;

whereby the resulting stabilized chewing gum includes at least about two-thirds of the amount of antioxidant initially added to the continuous mixer thereby reflecting minimal degradation of the antioxidant and resulting by-products.

26. The method of claim 25, wherein the stabilizer chewing gum includes at least about three-fourths of the amount of antioxidant initially added to the continuous mixer.

27. A chewing gum product prepared according to the method of claim 26.

28. A chewing gum product prepared according to the method of claim 25.

29. A method of continuously making gum base having about the same level of antioxidant present in a base prepared using a batch process but less degradation products, comprising the steps of:

determining a target amount of antioxidant desired in a continuous manufacture of a gum base after a batch manufacture of the base;

estimating a percentage of antioxidant loss expected during continuous manufacture of the base, the loss being less than would be expected from the batch manufacturing process;

determining a starting level of antioxidant from the target amount and the percentage loss expected during continuous manufacture of the base; and manufacturing the gum base in a continuous mixer using the determined starting level of antioxidant;

whereby the starting level of antioxidant is less than would be needed to achieve the same target amount of antioxidant if the batch manufacturing process were used.

30. The method of claim 29, wherein the continuous mixer comprises a blade-and-pin mixer.

31. The method of claim 29, wherein the continuous mixer comprises a corotating twin screw extruder.

32. The method of claim 29, wherein the continuous mixer comprises a counterrotating twin screw extruder.

33. The method of claim 29, wherein the continuous mixer comprises a single screw extruder.

34. The method of claim 29, wherein the target amount of antioxidant is at least about two-thirds of the starting amount for continuous manufacture of the gum base.

35. The method of claim 29, wherein the target amount of antioxidant is at least about three fourths of the starting amount for continuous manufacture of the gum base.

36. A chewing gum base prepared according to the method of claim 35.

37. A chewing gum base prepared according to the method of claim 29.

38. A chewing gum base prepared by a continuous mixing process, which comprises a lower level of antioxidant degradation product than a gum base of the same essential composition prepared by a batch mixing process.

39. The gum base of claim 38 wherein the antioxidant degradation product is selected from the group consisting of complex furans, biphenyl compounds, and mixtures thereof.

40. A chewing gum product prepared according to an integrated method for making chewing gum base and chewing gum product in a single continuous mixer, which comprises a lower level of antioxidant degradation product than a chewing gum of the same essential composition prepared using separate mixers for the gum base and chewing gum.

41. The chewing gum product of claim 40, wherein the antioxidant degradation product is selected from the group consisting of complex furans, biphenyl compounds, and mixtures thereof.

42. A chewing gum product prepared according to an integrated method for making chewing gum base and chewing gum product in a single continuous mixer, which comprises a lower level of antioxidant degradation product than a chewing gum of the same essential composition prepared using a gum base made in a separate batch mixer.

43. The chewing gum product of claim 42, wherein the antioxidant degradation product is selected from the group consisting of complex furans, biphenyl compounds, and mixtures thereof.

* * * * *

UNITED STATES PATENT AND TRADEMARK OFFICE
CERTIFICATE OF CORRECTION

PATENT NO. : 5,545,416
DATED : August 13, 1996
INVENTOR(S) : Broderick et al.

It is certified that error appears in the above-identified patent and that said Letters Patent is hereby corrected as shown below:

On Page 2 of the title page, under OTHER PUBLICATIONS:

Column 1, line 21, replace "updated" with --undated--.

Column 1, line 23, replace "updated" with --undated--.

Column 1, line 25, replace "updated" with --undated--.

Column 1, line 28, replace "updated" with --undated--.

Column 2, line 7, replace "Proces" with --Process--.

Claim 1, line 12, replace "produced" with --production--.

Claim 9, line 8, delete "present".

Signed and Sealed this

Twenty-first Day of March, 2000

Attest:

Attesting Officer

Q. TODD DICKINSON

Commissioner of Patents and Trademarks